US012673492B2

(12) United States Patent
Takagi

(10) Patent No.: US 12,673,492 B2
(45) Date of Patent: Jul. 7, 2026

(54) LIQUID DISCHARGE HEAD SUBSTRATE, LIQUID DISCHARGE HEAD, LIQUID DISCHARGE APPARATUS, AND MANUFACTURING METHOD OF LIQUID DISCHARGE HEAD SUBSTRATE

(71) Applicant: CANON KABUSHIKI KAISHA, Tokyo (JP)

(72) Inventor: Makoto Takagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 18/442,485

(22) Filed: Feb. 15, 2024

(65) Prior Publication Data

US 2024/0278558 A1 Aug. 22, 2024

(30) Foreign Application Priority Data

Feb. 17, 2023 (JP) ................................ 2023-023633

(51) Int. Cl.
*B41J 2/14* (2006.01)
*B41J 2/16* (2006.01)

(52) U.S. Cl.
CPC ......... *B41J 2/14072* (2013.01); *B41J 2/1408* (2013.01); *B41J 2/1601* (2013.01); *B41J 2/1631* (2013.01); *B41J 2002/14491* (2013.01)

(58) Field of Classification Search
CPC .... B41J 2/14072; B41J 2/1408; B41J 2/1601; B41J 2/1631; B41J 2002/14491
See application file for complete search history.

(56) References Cited

U.S. PATENT DOCUMENTS

| | | | |
|---|---|---|---|
| 5,731,131 A | 3/1998 | Momma et al. | |
| 10,259,216 B2 | 4/2019 | Takagi | |
| 10,315,422 B2 | 6/2019 | Takagi | |
| 10,814,623 B2 | 10/2020 | Kasai et al. | |
| 2021/0221130 A1 * | 7/2021 | Takagi ................. | B41J 2/14072 |

FOREIGN PATENT DOCUMENTS

| | | |
|---|---|---|
| JP | 5-6849 | 1/1993 |

* cited by examiner

*Primary Examiner* — Jason S Uhlenhake
(74) *Attorney, Agent, or Firm* — VENABLE LLP

(57) ABSTRACT

A liquid discharge head substrate including liquid discharge elements arranged on a substrate along a first direction, opening portions provided in the substrate along the first direction, first wiring patterns passing between corresponding opening portions adjacent to each other and connected to corresponding liquid discharge elements, and second wiring patterns arranged along the first direction, is provided. The liquid discharge head substrate includes a connected region extending in a second direction crossing the first direction. In the connected region, each of the plurality of second wiring patterns has a wide portion which is thicker than a peripheral portion which is arranged in a peripheral region adjacent to the connected region, and the wide portions are arranged along the second direction.

15 Claims, 7 Drawing Sheets

LIQUID DISCHARGE HEAD SUBSTRATE, LIQUID DISCHARGE HEAD, LIQUID DISCHARGE APPARATUS, AND MANUFACTURING METHOD OF LIQUID DISCHARGE HEAD SUBSTRATE

BACKGROUND OF THE INVENTION

Field of the Invention

The present invention relates to a liquid discharge head substrate, a liquid discharge head, a liquid discharge apparatus, and a manufacturing method of a liquid discharge head substrate.

Description of the Related Art

A liquid discharge apparatus that gives energy to a liquid using a discharge element and discharges the liquid from an orifice has widely been used. In the liquid discharge apparatus, the print width of a printhead may be increased for high-speed printing. Japanese Patent Laid-Open No. 5-6849 shows, to obtain a large semiconductor device, dividing a pattern whose size is equal to or more than a field size exposable by one exposure of an exposure apparatus into a plurality of patterns and connecting the divided patterns.

SUMMARY OF THE INVENTION

In a liquid discharge head substrate, to permit an alignment error when connecting patterns, a position to connect the patterns needs to be examined.

Some embodiments of the present invention provide a technique advantageous in increasing the size of a liquid discharge head substrate.

According to some embodiments, a liquid discharge head substrate comprising: a substrate: a plurality of liquid discharge elements arranged on the substrate along a first direction: a plurality of opening portions provided in the substrate along the first direction: a plurality of first wiring patterns passing between corresponding opening portions adjacent to each other among the plurality of opening portions and connected to corresponding liquid discharge elements among the plurality of liquid discharge elements; and a plurality of second wiring patterns arranged along the first direction, wherein the liquid discharge head substrate includes a connected region arranged between first wiring patterns adjacent to each other among the plurality of first wiring patterns and extending in a second direction crossing the first direction, in the connected region, each of the plurality of second wiring patterns has a wide portion which is thicker than a peripheral portion which is arranged in a peripheral region adjacent to the connected region, and the wide portions are arranged along the second direction, is provided.

According to some other embodiments, a manufacturing method of a liquid discharge head substrate comprising: a substrate; a plurality of liquid discharge elements arranged on the substrate along a first direction; a plurality of opening portions provided in the substrate along the first direction; a plurality of first wiring patterns passing between corresponding opening portions adjacent to each other among the plurality of opening portions and connected to corresponding liquid discharge elements among the plurality of liquid discharge elements; and a plurality of second wiring patterns arranged along the first direction, wherein the plurality of second wiring patterns are formed by connecting patterns arranged in a first region exposed in a first exposure step and patterns arranged in a second region exposed in a second exposure step, the first region and the second region partially overlap, and a connected region in which the first region and the second region overlap passes between first wiring patterns adjacent to each other among the plurality of first wiring patterns, is provided. Further features of the present invention will become apparent from the following description of exemplary embodiments (with reference to the attached drawings).

DESCRIPTION OF THE EMBODIMENTS

Figure 1A:
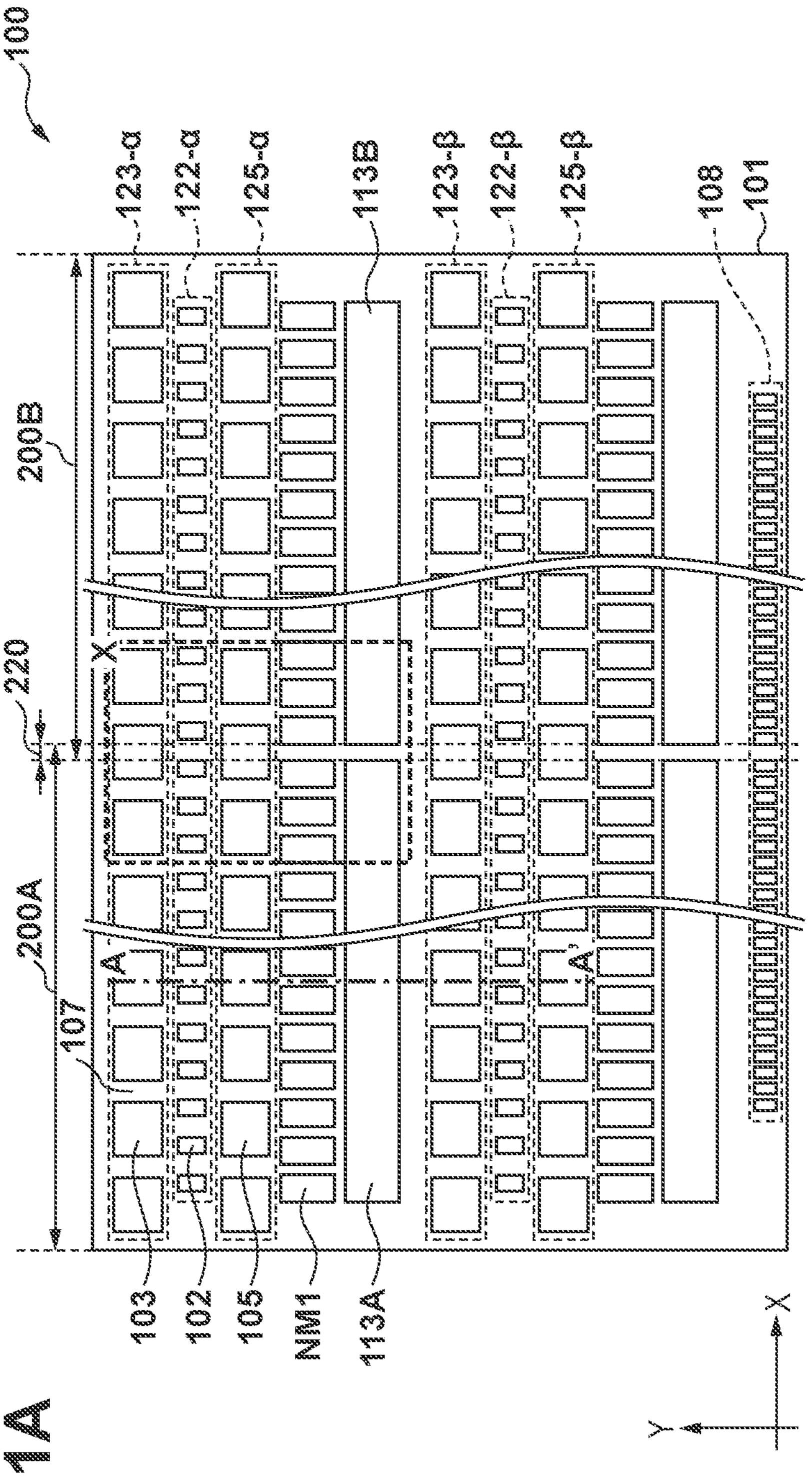
FIGS. 1A and 1B are views showing an example of the configuration of a liquid discharge head substrate according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Figure 1B:
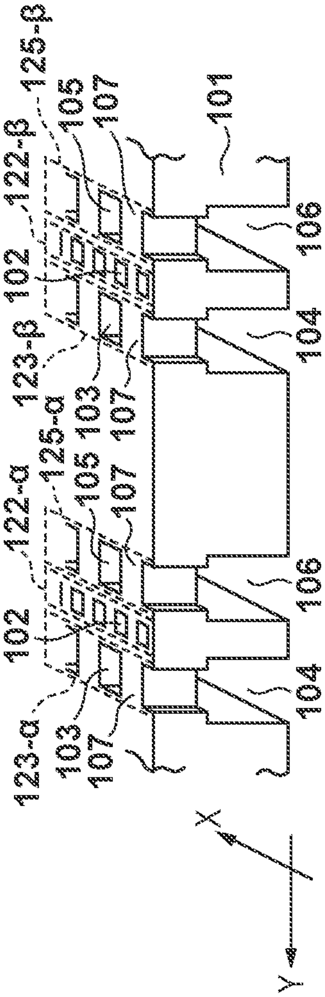

A liquid discharge head substrate according to an embodiment of the present disclosure will be described with reference to FIGS. 1A and 1B to 5. FIG. 1A is a view schematically showing an example of the layout of a liquid discharge head substrate 100 according to this embodiment. FIG. 1B is a perspective view of a state in which the liquid discharge head substrate 100 shown in FIG. 1A is cut along a line A-A'. In FIGS. 1A and 1B, a plurality of repetitive patterns arranged in the Y direction in the drawings are expressed by adding suffixes -α and -β. In the following explanation, if a plurality of constituent elements having the same structure exist, and it is necessary to identify each of these, a description will be made by appropriately adding suffixes. If these need not particularly be distinguished, a description will be made without adding suffixes.

The liquid discharge head substrate 100 includes a substrate 101, a plurality of liquid discharge elements 102 arranged along the X direction on the substrate 101, and a plurality of opening portions 105 provided in the substrate along the X direction to flow a liquid controlled by the plurality of liquid discharge elements. Each of the plurality of opening portions 105 can be, for example, a liquid recovery port configured to recover the liquid supplied to the plurality of liquid discharge elements 102. In this case, the liquid discharge head substrate 100 further includes a plurality of opening portions 103 functioning as liquid supply ports provided in the substrate 101 along the X direction to supply the liquid to the plurality of liquid discharge elements 102. The plurality of liquid discharge elements 102 are arranged between the plurality of opening portions 105 functioning as the liquid recovery ports and the plurality of opening portions 103 functioning as the liquid supply ports. However, the present invention is not limited to this, and each of the plurality of opening portions 105 may be a liquid supply port configured to supply the liquid to the plurality of liquid discharge elements 102. In this case, liquid recovery ports configured to recover the liquid supplied to the plurality of liquid discharge elements 102 may not be arranged. Also, for example, if the plurality of opening portions 105 function as the liquid supply ports, the liquid discharge head substrate 100 may further include the plurality of opening portions 103 functioning as the liquid recovery ports provided in the substrate 101 along the X direction to recover the liquid supplied to the plurality of liquid discharge elements 102. In this case, the plurality of liquid discharge elements 102 can be arranged between the plurality of opening portions 105 functioning as the liquid supply ports and the plurality of opening portions 103 functioning as the liquid recovery ports. A description will be made below assuming that the opening portions 103 function as the liquid supply ports, and the opening portions 105 function as the liquid recovery ports.

In the liquid discharge head substrate 100, a common supply path 104 configured to supply the liquid to the liquid discharge elements 102 via the plurality of opening portions 103, and a common recovery path 106 configured to recover the liquid from the liquid discharge elements 102 via the plurality of opening portions 105 are arranged. Also, structures 107 are arranged between the opening portions of the plurality of opening portions 103 and between the opening portions of the plurality of opening portions 105. Also, on the liquid discharge head substrate 100, a terminal array 108 configured to exchange signals between the liquid discharge head substrate 100 and the outside is arranged.

In this embodiment, when manufacturing the liquid discharge head substrate 100, some layers are formed by connecting patterns exposed in a plurality of exposure steps. In the configuration shown in FIG. 1A, a region 200A exposed in one exposure step and a region 200B exposed in another exposure step are arranged. The region 200A and the region 200B partially overlap, and the region where the region 200A and the region 200B overlap is defined as a connected region 220. In this embodiment, of the layers patterned when manufacturing the liquid discharge head substrate 100, the pattern of a polysilicon layer (POL), the pattern of a first metal layer (M1), and the opening pattern (ACT) of an insulating film (field oxide film) are individually exposed (divisionally exposed) in the region 200A and the region 200B. Also, the patterns are connected in the connected region 220.

The liquid discharge element 102 may be one of various kinds of elements proposed in a liquid discharge technique. For example, the liquid discharge element 102 is an element that converts electric energy into thermal energy or mechanical energy. The plurality of liquid discharge elements 102 are linearly arranged on the substrate 101 along the X direction, and form an element array 122-α and an element array 122-β.

The opening portions 103 are channels provided in correspondence with the liquid discharge elements 102 and configured to supply a liquid to the liquid discharge elements 102. On a surface of the liquid discharge head substrate 100, which is provided with the liquid discharge elements 102, the opening portions 103 functioning as the liquid supply ports are arranged on a line substantially parallel to the element array 122-α and the element array 122-β, and form an opening array 123-α and an opening array 123-β.

The opening portions 105 are channels provided in correspondence with the liquid discharge elements 102 and configured to recover the liquid to the liquid discharge elements 102. On a surface of the liquid discharge head substrate 100, which is provided with the liquid discharge elements 102, the opening portions 105 functioning as the liquid recovery ports are arranged on a line substantially parallel to the element array 122-α and the element array 122-β, and form an opening array 125-α and an opening array 125-β.

As shown in FIG. 1B, the opening portions 103 are channels extending in the thickness direction of the substrate 101 and communicate with the common supply path 104. In the opening array 123-α and the opening array 123-β, the opening portions 103 are separated, by the beam-shaped structures 107, from each other in the X direction. Similarly, the opening portions 105 are channels extending in the thickness direction of the substrate 101 and communicate with the common recovery path 106. In the opening array 125-α and the opening array 125-β, the opening portions 105 are separated, by the beam-shaped structures 107, from each other in the X direction. In the X direction, the width of the structures 107 and the width of the opening portions 103 and the opening portions 105 hold a tradeoff relationship.

The common supply path 104 and the common recovery path 106 are provided on the back surface side of the surface of the liquid discharge head substrate 100, which is provided with the liquid discharge elements 102. The common supply path 104 extends in the extending direction of the opening array 123 and communicates with the plurality of opening portions 103. The common recovery path 106 extends in the extending direction of the opening array 125 and communicates with the plurality of opening portions 105.

In the liquid discharge head substrate 100, the element arrays 122, the opening arrays 123, the common supply paths 104, the opening arrays 125, and the common recovery paths 106 are arranged in the region 200A and the region 200B. These constituent elements are connected in the connected region 220 and function as the integrated liquid discharge head substrate 100.

The opening array 123-α and the opening array 125-α are arranged on both sides of the corresponding element array 122-α. Similarly, the opening array 123-β and the opening array 125-β are arranged on both sides of the corresponding element array 122-β. This configuration can form the circulation path of the liquid that flows from the opening portions 103 functioning as the liquid supply ports to the opening portions 105 functioning as the liquid recovery ports via the upper portions of the liquid discharge elements 102. By circulating the liquid, it is possible to suppress evaporation of water in the liquid near the liquid discharge elements 102 and an increase of the viscosity of the liquid.

The liquid discharge head substrate 100 includes a pressure chamber (not shown) in which the liquid discharge elements 102 that generate energy to be used to discharge the liquid are provided. A liquid discharge head including the liquid discharge head substrate 100 is configured to circulate the liquid between the inside and the outside of the pressure chamber.

Figure 2:
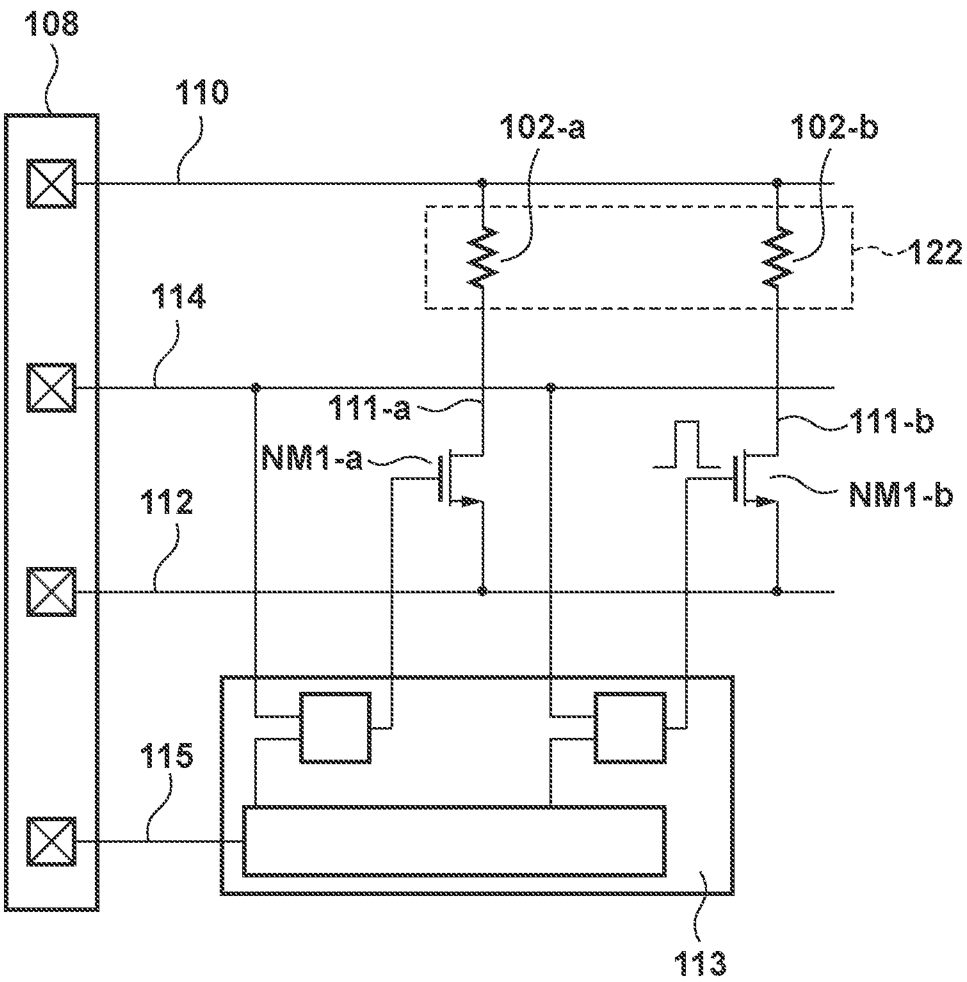
FIG. 2 is a circuit diagram including liquid discharge elements arranged on the liquid discharge head substrate shown in FIGS. 1A and 1B.

FIG. 2 is a circuit diagram including the liquid discharge elements 102 arranged on the liquid discharge head substrate

100. The element array 122 is formed by the plurality of liquid discharge elements 102. In FIG. 2, focus is place on two liquid discharge elements 102-*a* and 102-*b* among the plurality of liquid discharge elements 102. Also, as shown in FIG. 2, on the liquid discharge head substrate 100, a transistor NM1 is arranged as a driving element configured to control each of the liquid discharge elements 102. The transistor NM1 is, for example, an NMOS transistor.

In this embodiment, the liquid discharge element 102 is shown as a resistor. One terminal of the resistor is connected to a discharge element power supply line 110, and the other terminal is connected to the drain terminal of the transistor NM1 via a wiring pattern 111. The source terminal of the transistor NM1 is connected to a discharge element ground line 112. The gate terminal of the transistor NM1 is connected to a control circuit 113, and the operation of the transistor NM1 is controlled. The control circuit 113 is provided in correspondence with the element array 122. The control circuit 113 receives a heat enable signal supplied via a wiring pattern 114, and an image signal supplied via a wiring pattern 115 to on/off-control each liquid discharge elements 102. In accordance with the logic between the heat enable signal and the image signal, the control circuit 113 controls to select flowing/not flowing a current to the liquid discharge elements 102.

The potentials of the discharge element power supply line 110 and the discharge element ground line 112 are supplied from the outside of the liquid discharge head substrate 100 via the terminal array 108. Similarly, the heat enable signal flowing to the wiring pattern 114 and the image signal flowing to the wiring pattern 115 are supplied from the outside of the liquid discharge head substrate 100 via the terminal array 108.

Figure 3:
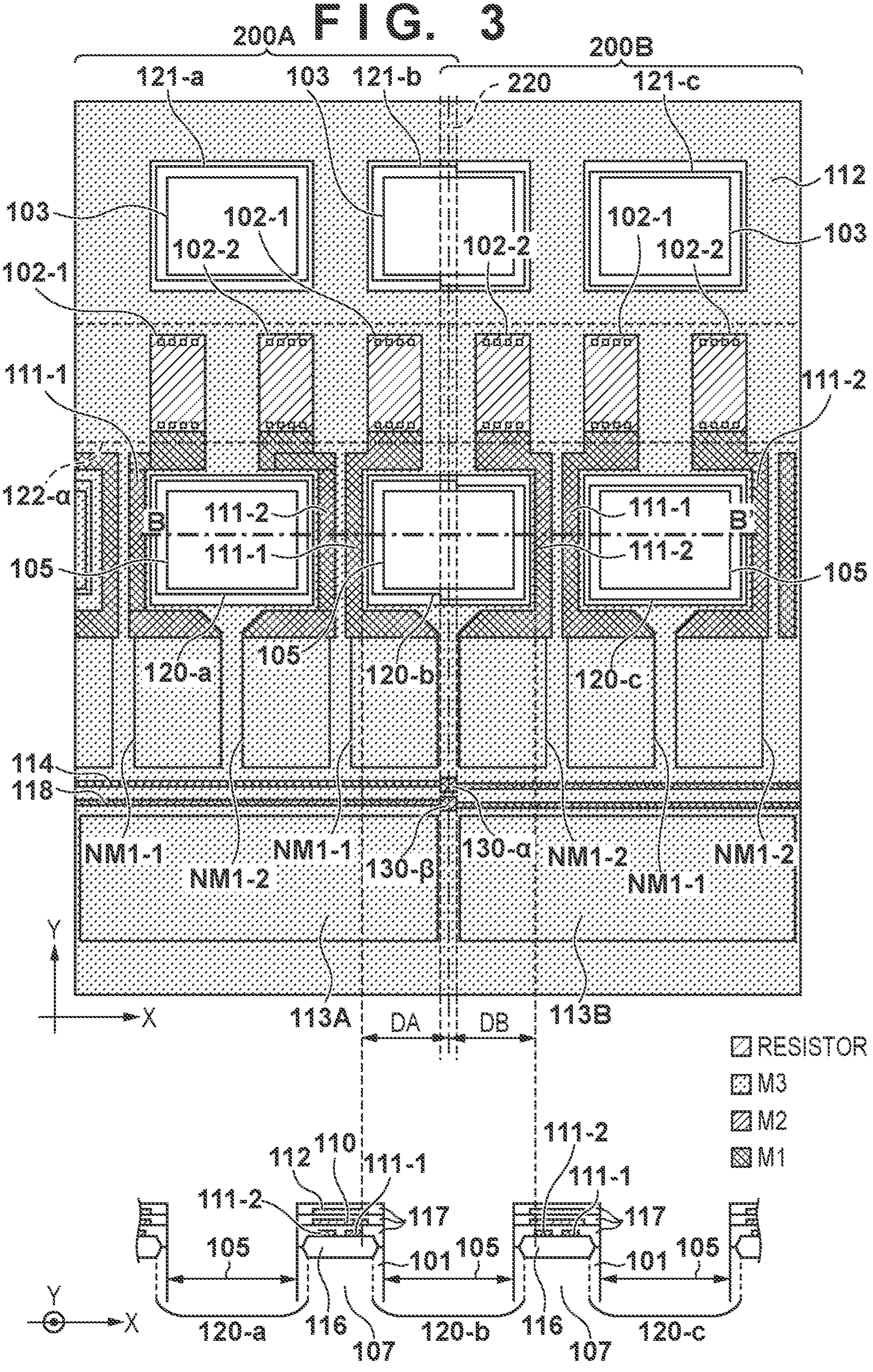
FIG. 3 is an enlarged view of the connected region of the liquid discharge head substrate shown in FIGS. 1A and 1B.

FIG. 3 is a view for explaining the arrangement of wiring patterns including the above-described wiring patterns 111 and 114 arranged on the liquid discharge head substrate 100. The upper side of FIG. 3 is a plan view of the layout in which a region X including the connected region 220 in FIG. 1A is enlarged. The lower side of FIG. 3 is a sectional view taken along a line B-B' in the plan view on the upper side.

Referring to FIG. 3, two liquid discharge elements 102-1 and 102-2 are arranged in correspondence with one set of opening portions 103 and 105 arranged in the Y direction. The control circuit 113 configured to control the transistors NM1 is arranged. The control circuit 113 is arranged on the opposite side of the opening portions 105 in the Y direction with respect to the transistors NM1. A control circuit 113A is a part of the control circuit 113 arranged in the region 200A, and a control circuit 113B is a part of the control circuit 113 arranged in the region 200B. The control circuit 113A and the control circuit 113B function as the control circuit 113 together. The plurality of wiring patterns 111 connected to corresponding liquid discharge elements 102 among the plurality of liquid discharge elements 102 pass between corresponding opening portions 105 adjacent to each other among the plurality of opening portions 105 and are connected to the transistors NM1. Accordingly, each of the plurality of liquid discharge elements 102 is connected to the transistor NM1 that is a corresponding driving element via a corresponding one of the plurality of wiring patterns 111. The wiring pattern 114 that supplies the heat enable signal and a wiring pattern 118 that supplies a clock signal cross the connected region 220 along the X direction and are arranged in the region 200A and the region 200B. The connected region 220 extends in the Y direction crossing the X direction. The X direction and the Y direction can be orthogonal to each other.

As shown in the sectional view of FIG. 3, the opening portions 105 adjacent to each other are separated by the structure 107. On the structure 107, a wiring pattern 111-1 that connects the liquid discharge element 102-1 and a transistor NM1-1, and a wiring pattern 111-2 that connects the liquid discharge element 102-2 and a transistor NM1-2 are arranged. The wiring pattern 111-1 and the wiring pattern 111-2 are formed using the first metal layer (M1) on the upper surface of the same structure 107. Here, the first metal layer (M1) can be a wiring layer closest to the substrate 101.

In addition, on the structure 107, the discharge element power supply line 110 formed using a second metal layer (M2), and the discharge element ground line 112 formed using a third metal layer (M3) are arranged to occupy the wiring layers. The second metal layer (M2) and the third metal layer (M3) are wiring layers arranged at positions farther apart from the substrate 101 than the first metal layer (M1).

The wiring width of the wiring pattern 111 in the X direction is, for example, 4 μm. The inter-wiring distance to separate the wiring pattern 111-1 and the wiring pattern 111-2 in the X direction is, for example, 0.4 μm. The wiring width of the wiring pattern 111 is narrower than that of the discharge element power supply line 110 and the discharge element ground line 112, and the separation distance when arranging the pattern is narrow, too. The wiring pattern 111 arranged in the first metal layer (M1) is a pattern thinner than the discharge element power supply line 110 and the discharge element ground line 112 arranged in the second metal layer (M2) and the third metal layer (M3), respectively, as shown in the sectional view of FIG. 3. As the wiring patterns 114 and 118 arranged in the first metal layer (M1), a thin pattern is used as will be described later. For this reason, a fine pattern can be formed by dividing an exposure field using a reduction projection exposure apparatus. On the other hand, the wiring patterns arranged in the second metal layer (M2) and the third metal layer (M3) can each be a pattern whose wiring width is wider than that of the wiring pattern arranged in the first metal layer (M1). Hence, as for the wiring patterns including the discharge element power supply line 110 formed using the second metal layer (M2), the patterns in the region 200A and the region 200B are exposed at once in one exposure step using, for example, a reduction projection exposure apparatus whose exposure field is wider (magnification is lower). Similarly, as for the wiring patterns including the discharge element ground line 112 formed using the third metal layer (M3), the patterns in the region 200A and the region 200B are exposed in one exposure step.

In FIG. 3, a field opening portion 120 formed in an insulating film 116 (field oxide film) arranged in contact with the substrate 101 is arranged around the opening portion 105. For the substrate 101, for example, silicon or the like is used. For the insulating film 116, for example, silicon oxide or the like is used. The insulating film 116 is arranged between the substrate 101 and the wiring pattern 111 (first metal layer (M1)). Of the field opening portions 120, a field opening portion 120-*b* is exposed and patterned across the region 200A and the region 200B. Hence, in the connected region 220, the field opening portion 120-*b* has a shape different from field opening portions 120-*a* and 120-*c* exposed in one exposure because a relative position deviation (misalignment) occurs between two exposure steps. More specifically, the insulating film 116 is arranged to surround each of the plurality of opening portions 105. In the connected region 220, the insulating film 116 has a step difference in the Y direction caused by the relative position deviation in exposure, as indicated by the field opening portion 120-*b* in FIG. 3. For the insulating film 116 arranged outside the connected region 220, since the field opening portions 120 are exposed at once, no step difference in the Y direction is generated. In this embodiment, the opening portions 105 are formed by batch exposure on the whole liquid discharge head substrate 100. Hence, all the opening portions 105 have the same shape.

Similarly, a field opening portion 121 formed in the insulating film 116 (field oxide film) is arranged around the opening portion 103. Of the field opening portions 121, a field opening portion 121-*b* is exposed and patterned across the region 200A and the region 200B. Hence, in the connected region 220, the field opening portion 121-*b* has a shape different from field opening portions 121-*a* and 121-*c* exposed in one exposure because a relative position deviation (misalignment) occurs between two exposure steps. More specifically, the insulating film 116 is arranged to surround each of the plurality of opening portions 103. In the connected region 220, the insulating film 116 has a step difference in the Y direction caused by the relative position deviation in exposure, as indicated by the field opening portion 121-*b* in FIG. 3. For the insulating film 116 arranged outside the connected region 220, since the field opening portions 121 are exposed at once, no step difference in the Y direction is generated. In this embodiment, the opening portions 103 are formed by batch exposure on the whole liquid discharge head substrate 100. Hence, all the opening portions 103 have the same shape.

As each of the wiring pattern 114 that supplies the heat enable signal and the wiring pattern 118 that supplies the clock signal, a thin pattern can be used from the viewpoint of layout area reduction. The wiring patterns 114 and 118 are formed using the first metal layer (M1), like the wiring pattern 111. Hence, the wiring patterns 114 and 118 are formed by connecting patterns arranged in the region 200A exposed in one exposure step and patterns arranged in the region 200B exposed in another exposure step. Auxiliary patterns for making the wiring patterns 114 and 118 thick are arranged in the connected region 220 such that the wiring patterns 114 and 118 are not interrupted even if there is a relative misalignment between the region 200A and the region 200B. Hence, in the connected region 220, the plurality of wiring patterns 114 and 118 have wide portions 130-α and 130-β which are thicker than peripheral portions which are arranged in a peripheral region adjacent to the connected region, and the wide portions 130-α and 130-β are arranged along the Y direction. Even in an ideal case where no relative misalignment is generated between the region 200A and the region 200B, the plurality of wide portions 130-α and 130-β are arranged in the Y direction by the auxiliary patterns. Hence, the connected region 220 can be defined as a region extending, in the direction (Y direction) of arranging the plurality of wide portions 130-α and 130-β, while having the width of the plurality of wide portions 130-α and 130-β in the X direction (the direction in which the wiring patterns 114 and 118 extend). If there is a misalignment between the region 200A and the region 200B, the connected region 220 can be defined by the existence of a pattern that connects the region 200A and the region 200B, such as the pattern shape of the above-described field opening portion 121-*b*.

As described above, the wiring patterns 114 and 118 are arranged using the first metal layer (M1) closest to the substrate 101 in the wiring layers including the wide portions 130. It can therefore be said that the plurality of wiring patterns 111 are arranged in the same wiring layer as the wide portions 130.

As shown in the sectional view of FIG. 3, the wiring patterns 111, the discharge element power supply line 110, and the discharge element ground line 112 arranged on the insulating film 116 are electrically insulated by insulating layers 117. For the insulating layer 117, for example, a BPSG film may be used. The BPSG film is readily eroded by an ink solvent that is a liquid discharged by the liquid discharge elements 102. If the field opening portions 120 are made large, the distance between the opening portion 105 through which the liquid flows and the wiring patterns 111, the discharge element power supply line 110, and the discharge element ground line 112 may be short. This is because, from the viewpoint of layout area reduction, the layout of the metal patterns such as the wiring patterns 111, the discharge element power supply line 110, and the discharge element ground line 112 is arranged to be as close as possible to the field opening portion 120. In this case, there are fears that the wiring patterns 111, the discharge element power supply line 110, and the discharge element ground line 112 covered with the insulating layers 117 using the BPSG film are eroded by the discharge liquid.

Hence, for example, the size of the field opening portion 120 may be 85×85 μm, and the size of the opening portion 105 may be 75×75 μm. Thus, even if a relative position deviation occurs between the region 200A and the region 200B in exposure, the opening portion 105 is arranged with a sufficient clearance to the field opening portion 120. For this reason, the auxiliary pattern for connection is not provided in the field opening portion 120-*b* arranged across the region 200A and the region 200B. The insulating film 116 around the opening portion 103 can also have the same configuration.

In this embodiment, the connected region 220 passes between the wiring patterns 111 adjacent to each other among the plurality of wiring patterns 111. In this case, one of the plurality of opening portions 105 may be arranged between the wiring patterns 111 which are adjacent to each other and between which the connected region 220 is arranged. As shown in FIG. 3, the connected region 220 may pass through a region formed by an opening portion, which is arranged between the wiring patterns 111 adjacent to each other among the plurality of opening portions 105, and a portion between this opening portion and one wiring pattern of the wiring patterns 111 adjacent to this opening portion. In other words, the connected region 220 can be arranged closer to the side of the opening portion 105 between the patterns arranged between the wiring patterns 111 adjacent to each other than the wiring patterns 111 adjacent to each other. In addition, the connected region 220 may pass through one of the plurality of opening portions 105. As shown in FIG. 3, in an orthographic projection to the surface of the substrate 101 on which the liquid discharge elements 102 and the like are arranged, the center of the connected region 220 and the center of the opening portion 105 through which the connected region 220 passes may match. When the connected region 220 passes through the opening portion 105, only the two wiring patterns 111-1 and 111-2 and the space between the wiring pattern 111-1 and the wiring pattern 111-2 need to be arranged within the width of the structure 107 in the X direction. For this reason, the width of the structure 107 in the X direction can be formed by a minimum width. As a result, the width of the opening portion 105 in the X direction to flow the liquid can be maximized.

As a comparative example, a case where the connected region 220 is arranged on the structure 107 in which the two independent wiring patterns 111 are arranged will be examined. As the arrangement of the connected region 220, a case where the connected region 220 is provided to overlap one wiring pattern 111 and a case where the connected region 220 is arranged between the two wiring patterns 111 can be considered.

If the connected region 220 is arranged to overlap one wiring pattern 111, the thickness of the wiring pattern 111 arranged in the connected region 220 is assumed to be uneven due to the relative misalignment between the region 200A and the region 200B. For this reason, the resistance value of the wiring pattern 111 arranged in the connected region 220 is different from the resistance value of the wiring pattern 111 that is not arranged in the connected region 220, and the heat generation amount of the liquid discharge element 102 is considered to vary.

Also, if a wiring pattern using a polysilicon layer (POL) with a higher resistance value is arranged on the structure 107, the influence of the variation of the resistance value is assumed to be larger than in the wiring pattern using the first metal layer (M1). Consider a case where, for example, a wiring pattern of the first metal layer (M1) thinner than 1 μm is provided on the structure 107. In this case, considering disconnection of the wiring pattern due to misalignment, it is difficult to arrange the wiring pattern of the first metal layer (M1) thinner than 1 μm overlapping the connected region 220. Hence, the connected region 220 needs to pass between the wiring patterns 111 adjacent to each other among the plurality of wiring patterns 111.

If the connected region 220 is arranged between two wiring patterns 111 arranged on the structure 107, the space between the wiring patterns 111 needs to be set (for example, 2 μm) to further ensure the clearance with respect to the width of the connected region 220. As described above, the separation distance between the wiring patterns 111 in the X direction is, for example, 0.4 μm. For this reason, the total space between the wiring patterns 111 and the wiring patterns 111 on the structure 107 is large. Hence, the connected region 220 passes between the wiring patterns 111 adjacent to each other among the plurality of wiring patterns 111, and further passes through not the structure 107 but the opening portion 105. This can decrease the width of the structure 107 in the X direction.

Let DA be the X-direction distance from the center of the connected region 220 in the X direction to the wiring pattern 111-1 arranged closest to one side in the X direction with respect to the center of the connected region 220 in the X direction. Similarly, let DB be the X-direction distance from the center of the connected region 220 in the X direction to the wiring pattern 111-2 arranged closest to the other side in the X direction with respect to the center of the connected region 220 in the X direction. In this embodiment, the distance DA and the distance DB substantially match (DA≈DB). However, the present invention is not limited to this. The connected region 220 need only be provided in a region closer to the center of the opening portion 105 than the end of the wiring pattern closest to the opening portion 105 among the wirings that are arranged in the wiring layer formed by connecting the patterns and pass on the structure 107. With this configuration, it is possible to minimize the wiring patterns necessary for the structure 107 and the region of the space between the wiring patterns while avoiding the disadvantages described above as the comparative example. As a result, a design that minimizes the width of the structure 107 in the X direction is possible.

In this embodiment, focusing on the element array 122-α, it is configured such that the opening array 123-α and the opening array 125-α are adjacent. In this configuration, the opening array 123-α and the opening array 125-α are arranged close (for example, adjacent) to the element array 122-α in consideration of refill performance to the pressure chamber after liquid discharge. For this reason, in the element array 122-α, the transistors NM1 that control the liquid discharge elements 102 are arranged on the opposite side across the opening array 125-α with respect to the liquid discharge elements 102. This also applies to a case where the transistors NM1 are provided on the side of the opening array 123-α. Hence, the wiring patterns 111 that connect the liquid discharge elements 102 and the transistors NM1 always pass through the structures 107. In this configuration, since the wiring patterns 111 provided individually in correspondence with the liquid discharge elements 102 are arranged in all structures 107, the effect of applying this embodiment can be large.

Figure 4:
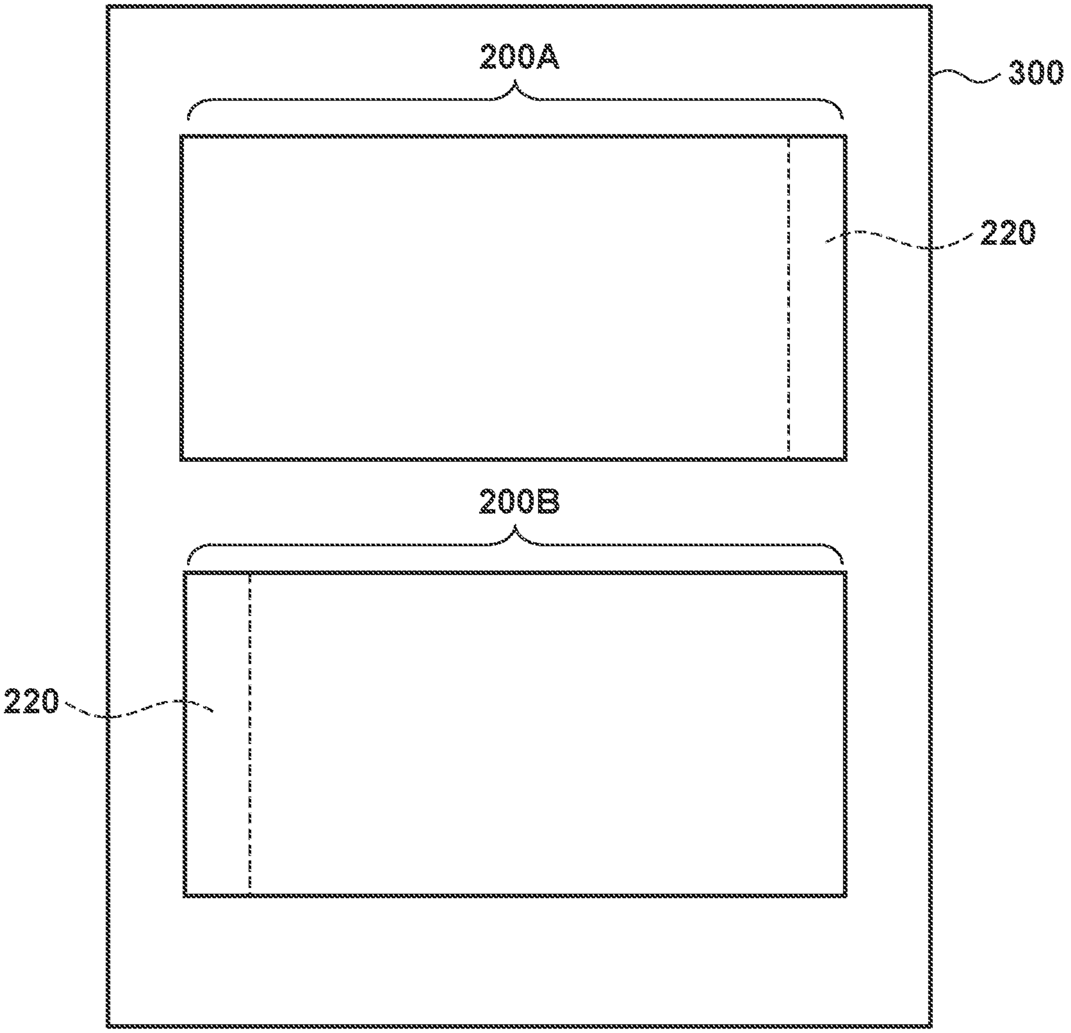
FIG. 4 is a layout diagram of a reticle when manufacturing the liquid discharge head substrate shown in FIGS. 1A and 1B.

FIG. 4 is a view showing an example of the layout of a reticle 300 of a layer to divisionally expose the region 200A and the region 200B. Together with a pattern for the region 200A and a pattern for the region 200B, patterns for the connected region 220 are arranged. When exposing the pattern of the region 200A, exposure is performed while hiding the pattern of the region 200B by a masking blade. Similarly, when exposing the pattern of the region 200B, exposure is performed while hiding the pattern of the region 200A by a masking blade.

In the liquid discharge head substrate 100, the length of the element array 122 arranged in the X direction is the print width capable of discharging droplets in one print operation. Hence, if the liquid discharge head substrate 100 is made large by connecting patterns in the X direction, the print width is increased, and high-speed printing is implemented. At this time, if the connected region 220 is arranged as described above, the liquid discharge head substrate 100 can be made large while maintaining print quality. The exposure field of the reduction projection exposure apparatus that performs divisional exposure has, for example, a rectangular shape of 33 mm×26 mm. In this embodiment, the short-side direction and the X direction in which the element array 122 is arranged match. With this configuration, as compared to a case where the long-side direction and the X direction match, many element arrays 122 can be arranged in the Y direction. For this reason, if the length of the substrate 101 in the X direction exceeds 26 mm, the effect of applying this embodiment can be large.

A pattern for forming openings in the insulating film 116, including the field opening portions 120 and 121, can include a pattern for forming the active regions of transistors and the like arranged on 3 the liquid discharge head substrate 100. The opening pattern (ACT) that forms the openings in the insulating film 116 is divisionally exposed. In the active region of a transistor, if patterns are connected, the electrical characteristic of the transistor may change as compared to a transistor that is arranged outside the connected region 220 and is intended to have the same shape. For this reason, the opening pattern (ACT) may be configured such that only the field opening portion 120-*b* is arranged in the connected region 220, and an opening pattern of the insulating film 116 such as the active region of a transistor is not provided in the connected region 220. For example, as shown in FIG. 3, the transistors NM1 that are driving elements for controlling the liquid discharge elements 102 and the control circuits 113 are not arranged in the connected region 220. On the other hand, for the opening portions 103 and the opening portions

105, performing an electrical operation is not assumed. Hence, in the layout, an influence to the electrical characteristic such as the output resistance or terminal capacitance of a transistor, which is assumed to occur when the active regions of transistors are connected, does not occur.

In the above-described embodiment, the opening patterns (ACT) of the polysilicon layer (POL), the first metal layer (M1), and the insulating film 116 (field oxide film) are individually exposed in the region 200A and the region 200B, and the patterns are connected in the connected region 220. However, the patterns to be divisionally exposed are not limited to these. It is possible to perform divisional exposure for all layers necessary for forming fine patterns and connect the patterns. Also, for example, for the opening pattern (ACT) of the insulating film 116, batch exposure may be performed using a reduction projection exposure apparatus whose exposure field is wider (magnification is lower) (for example, a 50 mm×50 mm wide exposure field).

In this embodiment, two element arrays 122 are arranged on the liquid discharge head substrate 100. However, the present invention is not limited to this, and only one element array 122 may be arranged, or three or more element arrays 122 may be arranged. Even in these cases, the above-described effect can be obtained.

In this embodiment, the element array 122 is arranged between the opening array 123 in which the plurality of opening portions 103 functioning as the liquid supply ports are arranged and the opening array 125 in which the plurality of opening portions 105 functioning as the liquid recovery ports are arranged. However, the arrangement of the opening arrays is not limited to this. For example, the element array 122 may be arranged between the opening array 123 in which the plurality of opening portions 103 functioning as the liquid recovery ports are arranged and the opening array 125 in which the plurality of opening portions 105 functioning as the liquid supply ports are arranged. Also, for example, the opening array 125 in which the plurality of opening portions 105 functioning as the liquid supply ports are arranged and the element array 122 may be arranged to be adjacent to each other, and the opening array 123 may not be arranged. Even in these cases, the above-described effect can be obtained.

Figure 5:
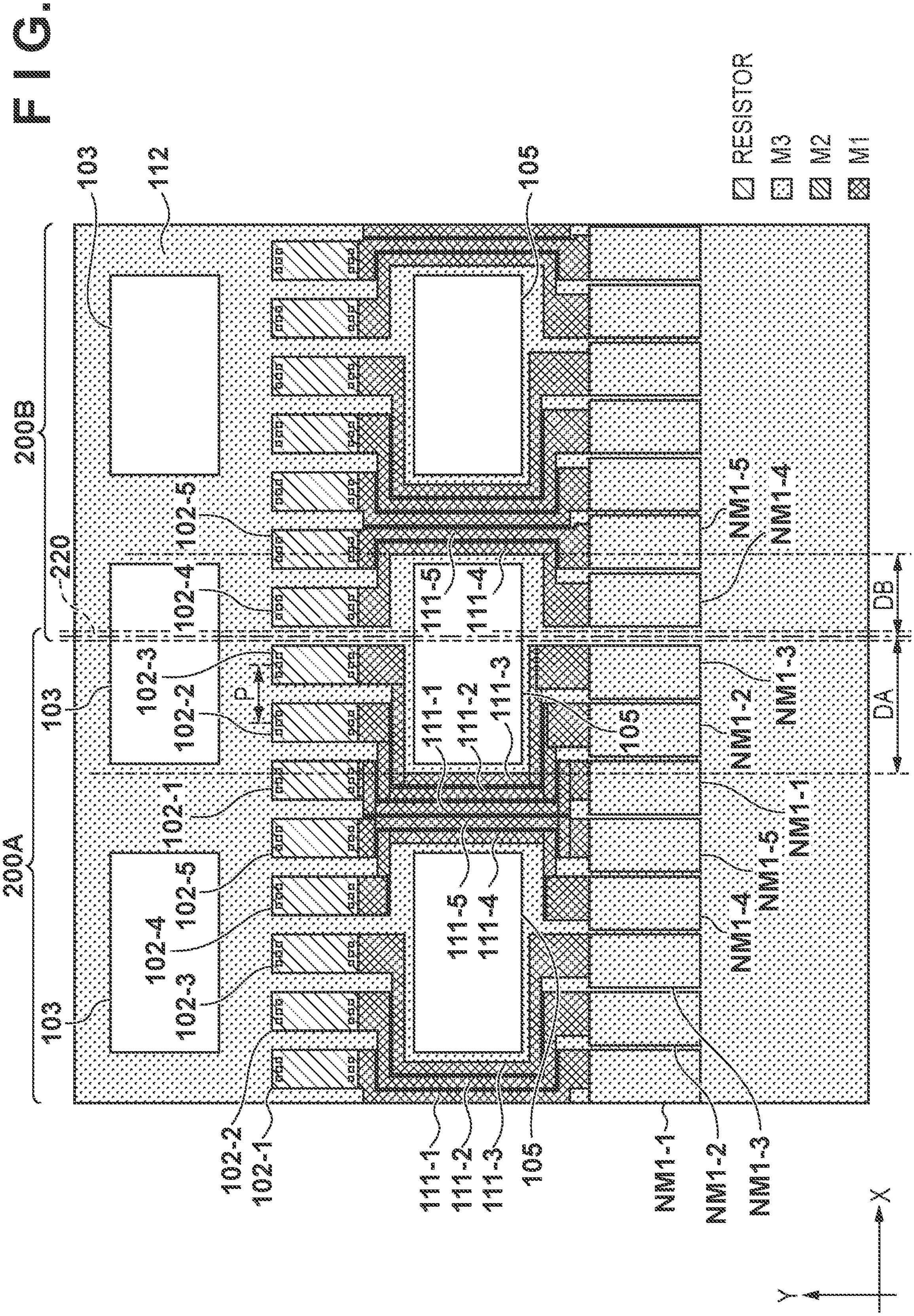
FIG. 5 is a view showing a modification of the liquid discharge head substrate shown in FIGS. 1A and 1B.

FIG. 5 is a view showing a modification of the arrangement of the liquid discharge elements 102, the opening portions 103 and 105, the wiring patterns 111, the transistors NM1, and the connected region 220 shown in FIG. 3. FIG. 5 is a plan view of the layout in which the region X including the connected region 220 in FIG. 1A is enlarged, like the upper side of FIG. 3. The arrangement of the wiring patterns 114 and 118 and the arrangement of the control circuits 113 may be the same as those shown in FIG. 3, and are not illustrated in FIG. 5.

In the configuration shown in FIG. 5, the number of liquid discharge elements 102 corresponding to one pair of the opening portion 103 and the opening portion 105 is different, as compared to the configuration shown in FIG. 3. More specifically, five liquid discharge elements 102 are arranged in correspondence with one pair of the opening portion 103 and the opening portion 105.

Also, in the configuration shown in FIG. 3, the center of the connected region 220 in the X direction and the center of the opening portion 105 (passage opening portion 151) in the X direction are arranged to substantially match. Hence, the distance DA up to the wiring pattern 111-1 closest to the center of the connected region 220 in the X direction and the distance DB up to the wiring pattern 111-2 closest to the center of the connected region 220 in the X direction satisfy DA≈DB. On the other hand, in the configuration shown in FIG. 5, five wiring patterns 111-1 to 111-5 are arranged on the structure 107. The plurality of wiring patterns 111 include the wiring pattern 111-3 arranged closest to one side in the X direction with respect to the center of the connected region 220 in the X direction. Similarly, the plurality of wiring patterns 111 include the wiring pattern 111-4 arranged closest to the other side in the X direction with respect to the center of the connected region 220 in the X direction. Let DA be the distance from the center of the connected region 220 in the X direction to the wiring pattern 111-3, and DB be the distance from the center of the connected region 220 in the X direction to the wiring pattern 111-4. Also, let D be the difference between the distance DA and the distance DB, and P be the pitch to arrange the liquid discharge elements 102 along the X direction. In this case, to efficiently make the layout in the region between the liquid discharge elements 102 and the opening portions 105 and the region between the opening portions 105 and the transistors NM1, the relationship of expression (1) may hold.

$$D = |DA - DB| \le P \tag{1}$$

Here, in the region between the liquid discharge elements 102 and the opening portions 105, consider the difference between the number of wiring patterns extending to the left side in the X direction and the number of those extending to the right side among the wiring patterns 111 connected to the liquid discharge elements 102 arranged in correspondence with one opening portion 105. If the relationship of expression (1) holds, no wiring patterns 111 are arranged beyond the connected region 220, and the difference between the number of wiring patterns 111 extending to the left side in the X direction and the number of those extending to the right side can be one or less.

On the other hand, if the relationship of expression (1) does not hold, to reduce the difference between the number of wiring patterns 111 extending to the left side in the X direction and the number of those extending to the right side, the wiring patterns 111 need to be arranged beyond the connected region 220. If the wiring patterns 111 are arranged beyond the connected region 220, an auxiliary pattern for coping with the relative misalignment between the region 200A and the region 200B needs to be provided in the connected region 220. Hence, the layout size in the Y direction becomes large. Furthermore, the resistance value may vary between the wiring patterns 111 that pass through the connected region 220 and the wiring patterns 111 that do not pass through the connected region 220.

Hence, if the liquid discharge head substrate 100 is designed to satisfy the relationship of expression (1), the design can be made while reducing the distance between the liquid discharge elements 102 and the opening portion 105, and the refill characteristic of the liquid discharge head substrate 100 can be improved.

Other Embodiments

Figure 6A:
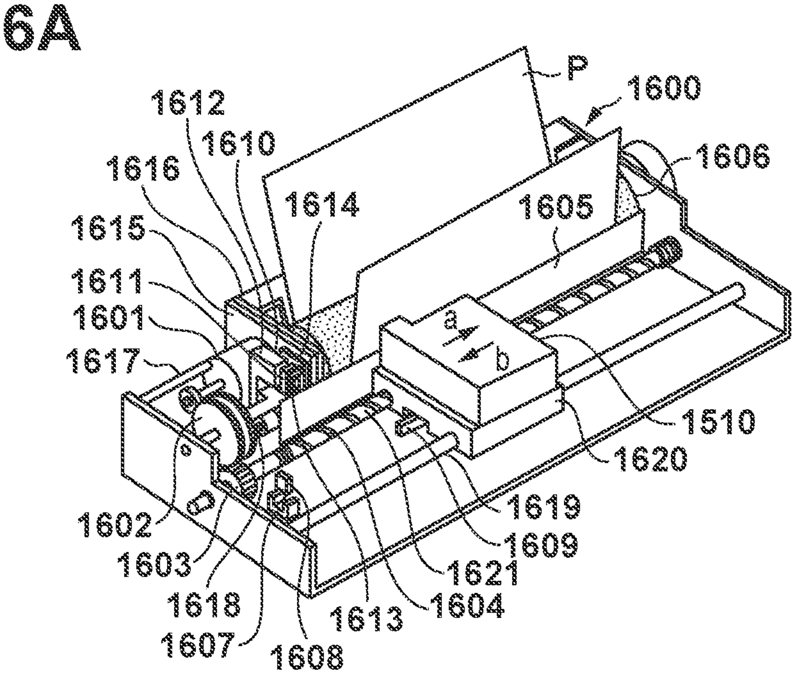
FIGS. 6A and 6D are views showing an example of the configuration of a liquid discharge apparatus using the liquid discharge head substrate shown in FIGS. 1A and 1B.

A liquid discharge apparatus using the above-described liquid discharge head substrate 100 will be explained with reference to FIGS. 6A to 6D. FIG. 6A exemplifies the internal arrangement of a liquid discharge apparatus 1600 typified by an inkjet printer, a facsimile apparatus, or a copying machine. In this example, the liquid discharge apparatus may also be called a printing apparatus. The liquid discharge apparatus 1600 includes a liquid discharge head 1510 that discharges a liquid (in this example, ink or a printing material) to a predetermined medium P (in this example, a printing medium such as paper). In this example, the liquid discharge head may also be called a printhead. The liquid discharge head 1510 is mounted on a carriage 1620, and the carriage 1620 can be attached to a lead screw 1621 having a helical groove 1604. The lead screw 1621 can rotate in synchronization with rotation of a driving motor 1601 via driving force transmission gears 1602 and 1603. The liquid discharge head 1510 can move in a direction indicated by an arrow a or b along a guide 1619 together with the carriage 1620.

The medium P is pressed by a paper press plate 1605 in the carriage moving direction and fixed to a platen 1606. The liquid discharge apparatus 1600 performs liquid discharge (in this example, printing) to the medium P conveyed on the platen 1606 by a conveyance unit (not shown) by reciprocating the liquid discharge head 1510.

The liquid discharge apparatus 1600 confirms the position of a lever 1609 provided on the carriage 1620 via photocouplers 1607 and 1608, and switches the rotational direction of the driving motor 1601. A support member 1610 supports a cap member 1611 for covering the nozzle (liquid orifice or simply orifice) of the liquid discharge head 1510. A suction portion 1612 performs recovery processing of the liquid discharge head 1510 by sucking the interior of the cap member 1611 via an intra-cap opening 1613. A lever 1617 is provided to start recovery processing by suction, and moves along with movement of a cam 1618 engaged with the carriage 1620. A driving force from the driving motor 1601 is controlled by a well-known transmission mechanism such as a clutch switch.

A main body support plate 1616 supports a moving member 1615 and a cleaning blade 1614. The moving member 1615 moves the cleaning blade 1614 to perform recovery processing of the liquid discharge head 1510 by wiping. The liquid discharge apparatus 1600 includes a controller (not shown) and the controller controls driving of each mechanism described above.

Figure 6B:
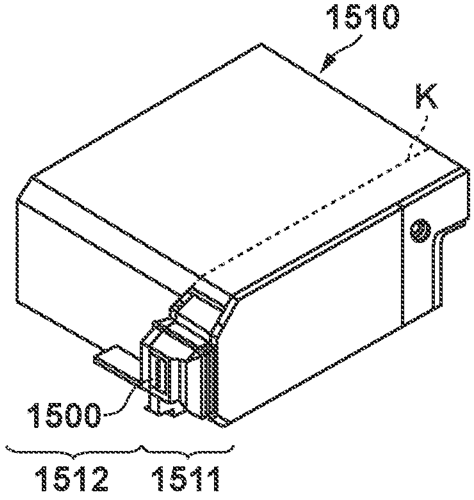

FIG. 6B exemplifies the outer appearance of the liquid discharge head 1510. The liquid discharge head 1510 can include a head portion 1511 having a plurality of nozzles 1500, and a tank (liquid storage portion) 1512 that holds a liquid to be supplied to the head portion 1511. The tank 1512 and the head portion 1511 can be separated at, for example, a broken line K and the tank 1512 is interchangeable. The liquid discharge head 1510 has an electrical contact (not shown) for receiving an electrical signal from the carriage 1620 and discharges a liquid in accordance with the electrical signal. The tank 1512 has a fibrous or porous liquid holding member (not shown) and the liquid holding member can hold a liquid.

Figure 6C:
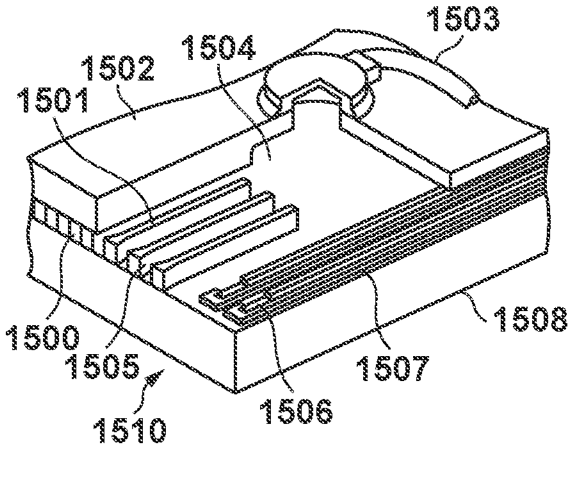

FIG. 6C exemplifies the internal arrangement of the liquid discharge head 1510. The liquid discharge head 1510 includes a base 1508, flow path wall members 1501 that are arranged on the base 1508 and form flow paths 1505, and a top plate 1502 having a liquid supply path 1503. The base 1508 may be the above-described liquid discharge head substrate 100. As discharge elements or liquid discharge elements, heaters 1506 (to be also referred to as electrothermal transducers or heat generating resistive elements) are arrayed on the substrate (liquid discharge head substrate) of the liquid discharge head 1510 in correspondence with the respective nozzles 1500. Each heater 1506 is driven to generate heat by turning on a driving element (switching element such as a transistor) provided in correspondence with the heater 1506.

A liquid from the liquid supply path 1503 is stored in a common liquid chamber 1504 and supplied to each nozzle 1500 via the corresponding flow path 1505. The liquid supplied to each nozzle 1500 is discharged from the nozzle 1500 in response to driving of the heater 1506 corresponding to the nozzle 1500.

Figure 6D:
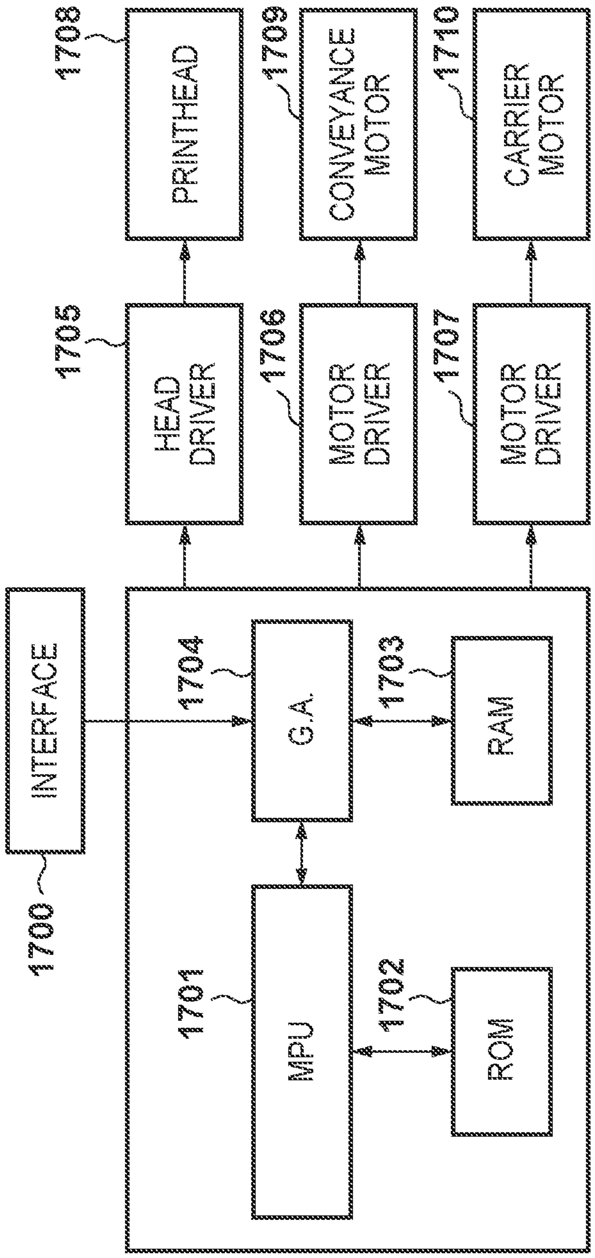

FIG. 6D exemplifies the system arrangement of the liquid discharge apparatus 1600. The liquid discharge apparatus 1600 includes an interface 1700, a MPU 1701, a ROM 1702, a RAM 1703, and a gate array (G.A.) 1704. The interface 1700 receives from the outside an external signal for executing liquid discharge. The ROM 1702 stores a control program to be executed by the MPU 1701. The RAM 1703 saves various signals and data such as the above-mentioned external signal for liquid discharge and data supplied to the liquid discharge head 1708. The gate array 1704 performs supply control of data to the liquid discharge head 1708 and control of data transfer between the interface 1700, the MPU 1701, and the RAM 1703.

The liquid discharge apparatus 1600 further includes a head driver 1705, motor drivers 1706 and 1707, a conveyance motor 1709, and a carrier motor 1710. The carrier motor 1710 conveys a liquid discharge head 1708. The conveyance motor 1709 conveys the medium P. The head driver 1705 drives the liquid discharge head 1708. The motor drivers 1706 and 1707 drive the conveyance motor 1709 and the carrier motor 1710, respectively.

When a driving signal is input to the interface 1700, it can be converted into data for liquid discharge between the gate array 1704 and the MPU 1701. Each mechanism performs a desired operation in accordance with this data. In this manner, the liquid discharge head 1708 is driven.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-023633, filed Feb. 17, 2023, which is hereby incorporated by reference herein in its entirety.

What is claimed is:

1. A liquid discharge head substrate comprising:

a substrate;

a plurality of liquid discharge elements arranged on the substrate along a first direction;

a plurality of opening portions provided in the substrate along the first direction;

a plurality of first wiring patterns passing between corresponding opening portions adjacent to each other among the plurality of opening portions and connected to corresponding liquid discharge elements among the plurality of liquid discharge elements; and a plurality of second wiring patterns arranged along the first direction, wherein the liquid discharge head substrate includes a connected region arranged between first wiring patterns adjacent to each other among the plurality of first wiring patterns and extending in a second direction crossing the first direction, in the connected region, each of the plurality of second wiring patterns has a wide portion which is thicker than a peripheral portion which is arranged in a peripheral region adjacent to the connected region, and the wide portions are arranged along the second direction.

2. The substrate according to claim 1, wherein one opening portion of the plurality of opening portions is arranged between the first wiring patterns adjacent to each other.

3. The substrate according to claim 2, wherein the connected region passes through a region formed by an opening portion between the first wiring patterns adjacent to each other among the plurality of opening portions and a portion between the opening portion and one wiring pattern of the first wiring patterns.

4. The substrate according to claim 2, wherein the plurality of first wiring patterns include a third wiring pattern arranged closest to one side in the first direction with respect to a center of the connected region in the first direction, and a fourth wiring pattern arranged closest to the other side in the first direction with respect to the center, and letting DA be a distance from the center to the third wiring pattern, DB be a distance from the center to the fourth wiring pattern, D be a difference between the distance DA and the distance DB, and P be a pitch to arrange the plurality of liquid discharge elements along the first direction, a relationship given by $D \leq P$ holds.

5. The substrate according to claim 1, wherein the connected region passes through an opening portion among the plurality of opening portions.

6. The substrate according to claim 1, wherein at least a part of the plurality of first wiring patterns are arranged in the same wiring layer as the plurality of wide portions.

7. The substrate according to claim 1, wherein the plurality of wide portions are arranged in a wiring layer closest to the substrate.

8. The substrate according to claim 1, further comprising an insulating film between the substrate and the plurality of first wiring patterns, and the insulating film is arranged to surround the plurality of opening portions and has a step difference in the second direction in the connected region.

9. The substrate according to claim 1, wherein each of the plurality of opening portions is a liquid recovery port configured to recover the liquid supplied to the plurality of liquid discharge elements, the liquid discharge head substrate further comprises a plurality of liquid supply ports provided in the substrate along the first direction to supply the liquid to the plurality of liquid discharge elements, and the plurality of liquid discharge elements are arranged between the plurality of opening portions and the plurality of liquid supply ports.

10. The substrate according to claim 1, wherein each of the plurality of opening portions is a liquid supply port configured to supply the liquid to the plurality of liquid discharge elements, the liquid discharge head substrate further comprises a plurality of liquid recovery ports provided in the substrate along the first direction to recover the liquid supplied to the plurality of liquid discharge elements, and the plurality of liquid discharge elements are arranged between the plurality of opening portions and the plurality of liquid recovery ports.

11. The substrate according to claim 1, further comprising a driving element configured to control each of the plurality of liquid discharge elements, wherein each of the plurality of liquid discharge elements is connected to the driving element via a corresponding first wiring pattern among the plurality of first wiring patterns.

12. The substrate according to claim 11, further comprising a control circuit configured to control an operation of the driving element, wherein the driving element and the control circuit are not arranged in the connected region.

13. The substrate according to claim 1, wherein a length of the substrate in the first direction exceeds 26 mm.

14. A liquid discharge head comprising:

the liquid discharge head substrate according to claim 1; and an orifice in which discharge of a liquid is controlled by the liquid discharge head substrate.

15. A liquid discharge apparatus comprising:

the liquid discharge head according to claim 14; and a unit configured to supply a driving signal for causing the liquid discharge head to discharge a liquid.

* * * * *